US011524586B2

United States Patent
Yanagita et al.

(10) Patent No.: US 11,524,586 B2
(45) Date of Patent: Dec. 13, 2022

(54) VEHICLE

(71) Applicant: SUBARU CORPORATION, Tokyo (JP)

(72) Inventors: Ayumu Yanagita, Tokyo (JP); Tatsuhiro Kubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 421 days.

(21) Appl. No.: 16/736,530

(22) Filed: Jan. 7, 2020

(65) Prior Publication Data
US 2020/0298709 A1   Sep. 24, 2020

(30) Foreign Application Priority Data

Mar. 20, 2019   (JP) ............................. JP2019-053709

(51) Int. Cl.
| B60L 15/20 | (2006.01) |
| B60W 10/184 | (2012.01) |
| G05D 1/02 | (2020.01) |
| G06V 20/56 | (2022.01) |
| G06V 20/58 | (2022.01) |

(52) U.S. Cl.
CPC ....... B60L 15/2009 (2013.01); B60W 10/184 (2013.01); G05D 1/0214 (2013.01); G05D 1/0223 (2013.01); G06V 20/56 (2022.01); G05D 2201/0213 (2013.01)

(58) Field of Classification Search
CPC ............. B60L 15/2009; B60L 3/0015; B60L 2240/12; B60L 2250/26; B60W 10/184; B60W 30/18109; B60W 50/0097; B60W 2520/10; B60W 2540/12; G05D 1/0214; G05D 1/0223; G05D 2201/0213; G06V 20/56; G06V 20/584; G06V 20/588; Y02T 10/64; Y02T 10/72
See application file for complete search history.

(56) References Cited

U.S. PATENT DOCUMENTS

2001/0044686 A1* 11/2001 Taniguchi ......... F16H 61/66259
                                                          701/61
2010/0114447 A1*  5/2010 Moriki .................... B60L 3/106
                                                          701/74
(Continued)

FOREIGN PATENT DOCUMENTS

JP            2016-034818 A        3/2016

*Primary Examiner* — Frederick M Brushaber
(74) *Attorney, Agent, or Firm* — McDermott Will & Emery LLP

(57) ABSTRACT

A vehicle includes a common pedal that receives an acceleration operation and a deceleration operation in accordance with a depression amount, a deceleration deriving unit that derives a deceleration of the vehicle based on the deceleration operation of the common pedal, a first distance deriving unit that derives a predicted stopping distance that is a distance between a current position of the vehicle and a predicted stop position at which the vehicle is predicted to stop when travelling at the derived deceleration, a second distance deriving unit that derives a target stopping distance that is a distance between the current position of the vehicle and a target stop position at which the vehicle is to stop, and a deceleration correcting unit that corrects the deceleration of the vehicle based on the predicted stopping distance and the target stopping distance.

9 Claims, 8 Drawing Sheets

(56) References Cited

U.S. PATENT DOCUMENTS

2015/0120168 A1* 4/2015 Kono ................... B60K 28/10
                                                    701/102
2021/0064894 A1* 3/2021 Ikezawa ................ G08G 1/166

* cited by examiner

FIG. 5

|  | | STOPPING DISTANCE DIFFERENCE | | |
|---|---|---|---|---|
|  | | SMALL | MEDIUM | LARGE |
| SPEED | SMALL | 5 | 30 | 100 |
|  | MEDIUM | 30 | 100 | 180 |
|  | LARGE | 100 | 180 | 250 |

FIG. 6A

SET INTER-VEHICLE DISTANCE: LARGE

|  |  | STOPPING DISTANCE DIFFERENCE (INTER-VEHICLE DISTANCE DIFFERENCE) | | |
|---|---|---|---|---|
|  |  | SMALL | MEDIUM | LARGE |
| RELATIVE SPEED | SMALL | 3 | 15 | 50 |
| | MEDIUM | 15 | 50 | 90 |
| | LARGE | 50 | 90 | 125 |

FIG. 6B

SET INTER-VEHICLE DISTANCE: MEDIUM

|  |  | STOPPING DISTANCE DIFFERENCE (INTER-VEHICLE DISTANCE DIFFERENCE) | | |
|---|---|---|---|---|
|  |  | SMALL | MEDIUM | LARGE |
| RELATIVE SPEED | SMALL | 5 | 30 | 100 |
| | MEDIUM | 30 | 100 | 180 |
| | LARGE | 100 | 180 | 250 |

FIG. 6C

SET INTER-VEHICLE DISTANCE: SMALL

|  |  | STOPPING DISTANCE DIFFERENCE (INTER-VEHICLE DISTANCE DIFFERENCE) | | |
|---|---|---|---|---|
|  |  | SMALL | MEDIUM | LARGE |
| RELATIVE SPEED | SMALL | 10 | 60 | 200 |
| | MEDIUM | 60 | 200 | 360 |
| | LARGE | 200 | 360 | 500 |

VEHICLE

CROSS-REFERENCE TO RELATED APPLICATIONS

The present application claims priority from Japanese Patent Application No. 2019-053709 filed on Mar. 20, 2019, the entire contents of which are hereby incorporated by reference.

BACKGROUND

The disclosure relates to a vehicle.

Japanese Unexamined Patent Application Publication No. 2016-34818 discloses a technique (what is called, single pedal function) that allows an acceleration operation and a deceleration operation of a vehicle by a single pedal.

SUMMARY

An aspect of the present disclosure provides a vehicle including a common pedal, a deceleration deriving unit, a first distance deriving unit, a second distance deriving unit, and a deceleration correcting unit. The common pedal is configured to receive an acceleration operation and a deceleration operation in accordance with a depression amount. The deceleration deriving unit is configured to derive a deceleration of the vehicle based on the deceleration operation of the common pedal. The first distance deriving unit is configured to derive a predicted stopping distance that is a distance between a current position of the vehicle and a predicted stop position at which the vehicle is predicted to stop when travelling at the deceleration derived by the deceleration deriving unit. The second distance deriving unit is configured to derive a target stopping distance that is a distance between the current position of the vehicle and a target stop position at which the vehicle is to stop. The deceleration correcting unit is configured to correct the deceleration of the vehicle based on the predicted stopping distance and the target stopping distance.

An aspect of the present disclosure provides a vehicle including a common pedal and circuitry. The common pedal is configured to receive an acceleration operation and a deceleration operation in accordance with a depression amount. The circuitry is configured to derive a deceleration of the vehicle based on the deceleration operation of the common pedal. The circuitry is configured to derive a predicted stopping distance that is a distance between a current position of the vehicle and a predicted stop position at which the vehicle is predicted to stop when travelling at derived the deceleration. The circuitry is configured to derive a target stopping distance that is a distance between the current position of the vehicle and a target stop position at which the vehicle is to stop. The circuitry is configured to correct the deceleration of the vehicle based on the predicted stopping distance and the target stopping distance.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 5 is a diagram illustrating a first correction amount map.

FIGS. 6A to 6C are diagrams each illustrating a second correction amount map.

DETAILED DESCRIPTION

In a single pedal function, when a driver is not accustomed to the operation, a technique for switching between the acceleration operation and the deceleration operation is used, and the deceleration operation is particularly difficult. Therefore, the driver who is not accustomed to the operation may be unable to appropriately stop the vehicle in some cases, for example, a case where the timing of the deceleration operation is shifted.

It is desirable to provide a vehicle capable of appropriately stopping.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
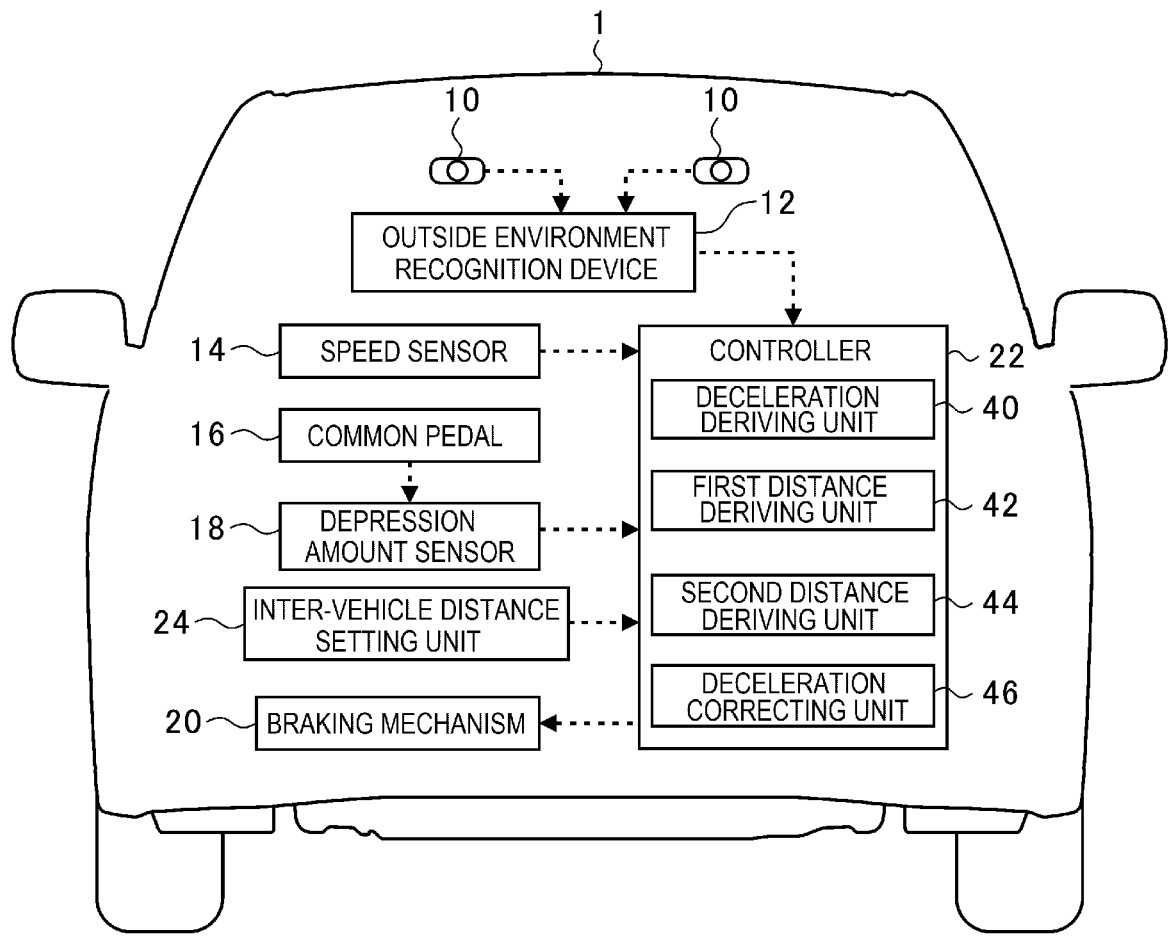
FIG. 1 is a schematic diagram illustrating the configuration of a vehicle according to an embodiment of the disclosure.

FIG. 1 is a schematic diagram illustrating the configuration of a vehicle 1 according to the embodiment of the disclosure. In FIG. 1, a flow of a control signal is indicated by arrows of dashed line. The configuration and processing related to the embodiment will be described in detail below, but the description of the configuration and processing unrelated to the embodiment will be omitted.

The vehicle 1 is an electric vehicle with a motor as a drive source, for example. Note that, the vehicle 1 may be an automobile with a motor as a drive source, or may be a hybrid electric vehicle including an engine along with the motor. Hereinafter, the vehicle 1 may be referred to as a host vehicle in some cases.

The vehicle 1 includes imaging devices 10, an outside environment recognition device 12, a speed sensor 14, a common pedal 16, a depression amount sensor 18, a braking mechanism 20, a controller 22, and an inter-vehicle distance setting unit 24.

Each of the imaging devices 10 includes imaging devices such as CCDs (Charge-Coupled Devices) and CMOSs (Complementary Metal-Oxide Semiconductors). In the vehicle 1, the two imaging devices 10 are provided apart from each other in a substantially horizontal direction. The two imaging devices 10 are provided such that respective optical axes are substantially parallel to each other on a side of a travel direction (front) of the vehicle 1.

The imaging device 10 captures an image of an object that is present in a detection area in front of the vehicle 1, and continuously generates a brightness image including at least information on the brightness for every predetermined frame. An object to be captured includes, for example, a vehicle other than the host vehicle, a traffic light, a road (traveling path), and a stop line, but is not limited thereto.

The outside environment recognition device 12 derives parallax information based on the brightness image generated in the imaging device 10, and generates a distance image including the parallax information. The outside environment recognition device 12 specifies the type of the object in the detection area, based on the brightness image and the distance image. In this manner, the outside environment recognition device 12 recognizes an outside environment in the travel direction of the vehicle 1. For example, the outside environment recognition device 12 recognizes a preceding vehicle in front of the host vehicle, a signal color of the traffic light, or a stop line on the road.

The speed sensor 14 detects a speed (what is called, a vehicle speed) of the vehicle 1. The common pedal 16 receives an acceleration operation and a deceleration operation in accordance with a depression amount. In other words, the vehicle 1 has a single pedal function that allows an acceleration operation and a deceleration operation with the single pedal (common pedal 16). The depression amount sensor 18 detects the depression amount of the common pedal 16.

Figure 2:
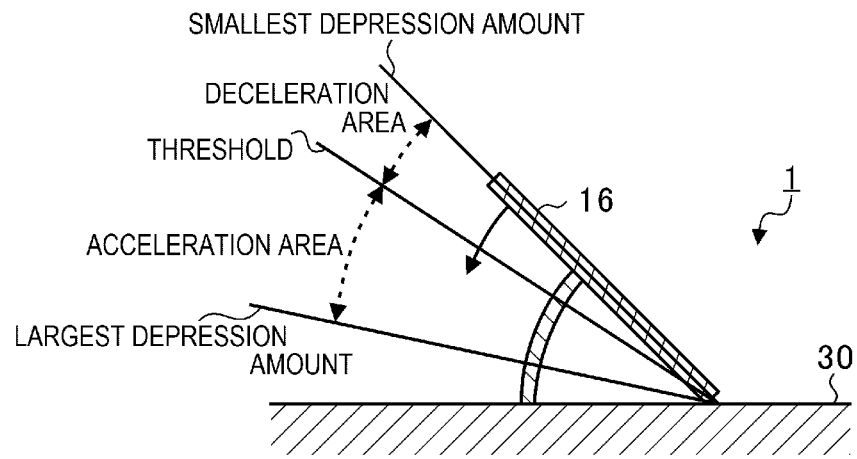
FIG. 2 is a diagram illustrating a common pedal.

FIG. 2 is a diagram illustrating the common pedal 16. In FIG. 2, the depression direction of the common pedal 16 is indicated by arrows of solid line. Moreover, in FIG. 2, the attitude of the vehicle 1 is horizontal. The common pedal 16 is provided vertically below and forward of a driver seat, for example, and is coupled to a vehicle body 30.

When the common pedal 16 is not depressed, an inclined angle of the common pedal 16 relative to the vehicle body 30 (vehicle 1) becomes the largest, and the depression amount becomes the smallest depression amount. Moreover, when the common pedal 16 is increasingly depressed, an inclined angle of the common pedal 16 relative to the vehicle body 30 (vehicle 1) becomes the smallest, and the depression amount becomes the largest depression amount.

The depression amounts (depression angles) of the common pedal 16 are classified into an acceleration area and a deceleration area. The acceleration area is an area in which the acceleration operation is received, and the deceleration area is an area in which the deceleration operation is received.

As for the common pedal 16, a predetermined threshold is set between the smallest depression amount and the largest depression amount. The predetermined threshold classifies the depression amounts of the common pedal 16 into the acceleration area and the deceleration area. For example, the deceleration area is set between the smallest depression amount and the predetermined threshold. Moreover, the acceleration area is set between the predetermined threshold and the largest depression amount. The predetermined threshold is set, for example, such that the acceleration area is larger than the deceleration area, but the embodiment is not limited to this example.

In the acceleration area, as the depression amount is more (as the inclined angle of the common pedal 16 is smaller), the amount of the acceleration operation in the vehicle 1 is larger.

In the deceleration area, as the depression amount is less (as the inclined angle of the common pedal 16 is larger), the amount of the deceleration operation in the vehicle 1 is larger. Moreover, in the deceleration area, a regenerative brake in which a motor is functioned as a generator to regenerate electric power to a battery is performed. Moreover, in the deceleration area, when the deceleration in accordance with the depression amount is not attained only by the regeneration, a mechanical brake is used together.

Moreover, when the depression amount is maintained to the smallest depression amount, the vehicle 1 is maintained in a state of the mechanical brake being applied. This maintains the common pedal 16 to the smallest depression amount. Therefore, the vehicle 1 can be continuously stopped even on a gradient road surface or the like without a driver being continuously depressing a brake pedal different from the common pedal 16.

Referring back to FIG. 1, the braking mechanism 20 decelerates or stops the vehicle 1 based on the deceleration operation of the common pedal 16. The braking mechanism 20 herein includes a regenerative brake. Note that, a brake pedal different from the common pedal 16 may be provided to the vehicle 1. In this case, the braking mechanism 20 may decelerate or stop the vehicle 1 based on the deceleration operation of the brake pedal.

The controller 22 includes a semiconductor integrated circuit including elements such as a central processing unit (CPU), a ROM storing programs and the like, and a RAM serving as a work area. The controller 22 controls respective units of the vehicle 1, such as a driving mechanism (not illustrated), a steering mechanism (not illustrated), and the braking mechanism 20.

Moreover, when the outside environment recognition device 12 recognizes an object that can be a cause of collision in the travel direction of the host vehicle (which may be referred to as a "specific object"), and a precrash brake condition is satisfied relative to the specific object, the controller 22 performs precrash brake control. The case where a precrash brake condition is satisfied indicates, for example, a condition in which a relative speed of the host vehicle relative to the specific object exceeds a predetermined speed (for example, 30 km/h), but the case is not limited to this condition. In the precrash brake control, the braking mechanism 20 is controlled to urgently stop the vehicle 1. Note that, the specific object is, for example, a preceding vehicle. However, the specific object is not limited to thereto. The specific object may be a person or a fixed object such as a guardrail.

Moreover, the controller 22 can control the driving mechanism and the braking mechanism 20 such that an inter-vehicle distance between the specific object and the host vehicle when the host vehicle stops becomes a preset inter-vehicle distance. The inter-vehicle distance when the host vehicle stops may be step-wisely set, for example, "large (for example, 5 m)", "medium (for example, 4 m)", and "small (for example, 3 m)".

The inter-vehicle distance setting unit 24 is a user interface that receives an operation of setting an inter-vehicle distance, and is provided to a driver seat, for example. The controller 22 stores therein a set value (for example, 4 m) of the inter-vehicle distance when the host vehicle stops that is input in accordance with an operation of setting the inter-vehicle distance setting unit 24. The inter-vehicle distance when the host vehicle stops that is set by the inter-vehicle distance setting unit 24 may be hereinafter referred to as a "set inter-vehicle distance".

Meanwhile, in the single pedal function by the common pedal 16, when a driver is not accustomed to the operation, a technique for switching between the acceleration operation and the deceleration operation is used, and the deceleration operation is particularly difficult. Therefore, the driver who is not accustomed to the operation may not appropriately stop the vehicle 1 in some cases. For example, when a timing of the deceleration operation of the common pedal 16 is delayed, the vehicle may stop over the stop line or an inter-vehicle distance between the vehicle and a preceding vehicle may be short. There is room for improvement in this respect.

Therefore, in the vehicle 1, when it is predicted during the deceleration operation of the common pedal 16 that the vehicle 1 is unable to appropriately stop, the deceleration of the vehicle 1 is corrected. For example, when it is predicted that the vehicle 1 stops over the stop line or the inter-vehicle distance between the vehicle 1 and the preceding vehicle is short because the timing of the deceleration operation of the common pedal 16 is delayed, the vehicle 1 increases the deceleration of the host vehicle.

Figure 3A:
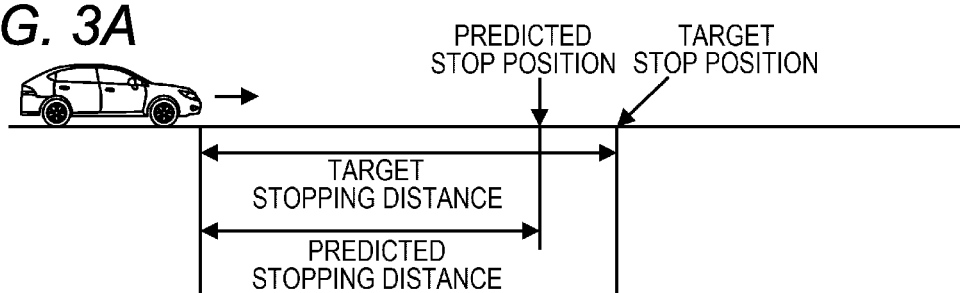
FIGS. 3A to 3D are diagrams illustrating correction of a deceleration when no specific object that can be a cause of collision is present in a travel direction of a host vehicle.
Figure 3B:
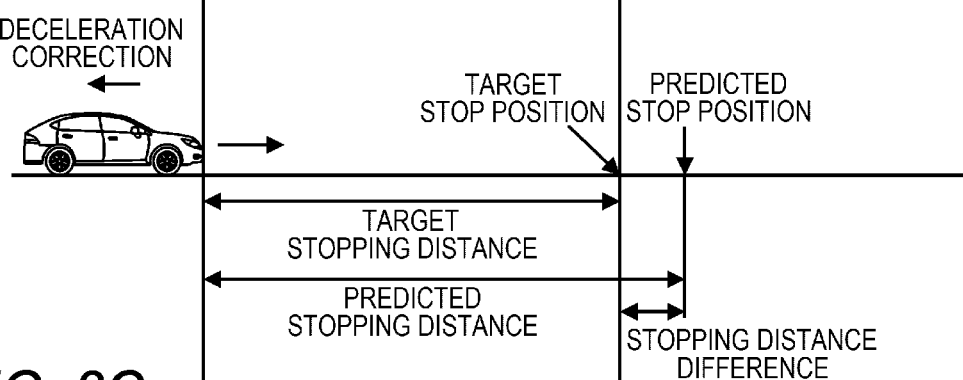
Figure 3C:
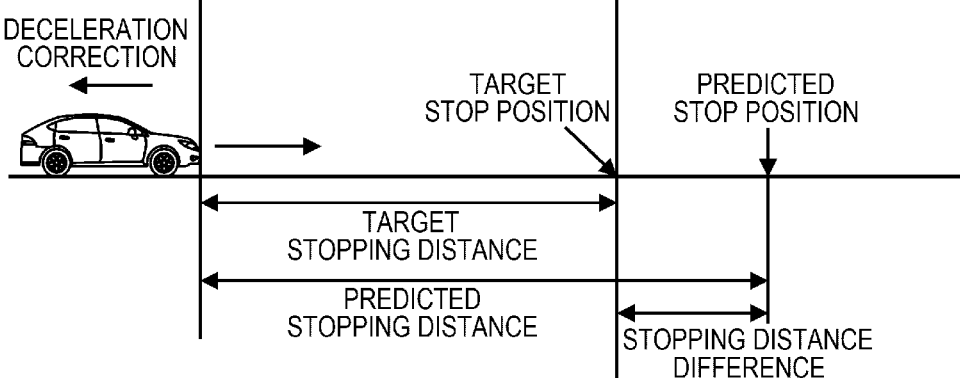
Figure 3D:
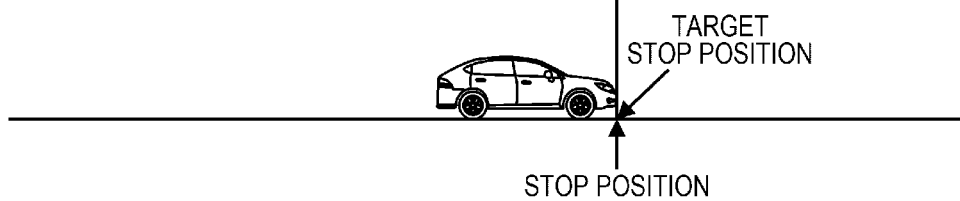

FIGS. 3A to 3D are diagrams illustrating the correction of the deceleration when no specific object that can be a cause of collision is present in the travel direction of the host vehicle. FIG. 3A illustrates a case where no correction of the deceleration is performed, FIG. 3B and FIG. 3C each illustrate a case where the correction of the deceleration is performed, and FIG. 3D illustrates a case where the host vehicle has finally stopped.

In FIGS. 3A to 3C, when recognizing a red signal in the travel direction, a driver of the host vehicle performs the deceleration operation with the common pedal 16 so as to stop the host vehicle at a target stop position (for example, a stop line) in front of the red signal and at which the host vehicle is to stop. When the deceleration operation is performed, the host vehicle decelerates at the deceleration in accordance with the deceleration operation, and is finally stopped. The deceleration in accordance with the deceleration operation of the common pedal 16 may be hereinafter referred to as a "pedal deceleration".

It is assumed that in FIG. 3A, the current speed of the host vehicle is slow, in FIG. 3B, the current speed of the host vehicle is faster than that in FIG. 3A, and in FIG. 3C, the current speed of the host vehicle is faster than that in FIG. 3B.

As illustrated in FIGS. 3A to 3C, a target stopping distance is a distance between the current position of the host vehicle and a target stop position that is a position at which the host vehicle is to stop. Moreover, a predicted stop position is a position at which the host vehicle is predicted to stop when travelling (decelerating) at the pedal deceleration. Moreover, a predicted stopping distance is a distance between the current position of the host vehicle and the predicted stop position. The predicted stopping distance differs depending on the current speed of the host vehicle and the current deceleration of the host vehicle.

In the case of FIG. 3A, the slow current speed of the host vehicle results in the predicted stopping distance shorter than the target stopping distance. In this case, the host vehicle does not go over the target stop position (for example, the stop line) when decelerating and stopping, and thus is capable of appropriately stopping. Therefore, in the vehicle 1, when the predicted stopping distance is shorter than the target stopping distance, no correction of the deceleration is performed but braking is performed at the pedal deceleration.

When the current speed of the host vehicle becomes faster, as illustrated in FIG. 3B, the predicted stopping distance is longer than the target stopping distance in some cases. Then, the host vehicle may go over the target stop position when decelerating and stopping. There is room for improvement in this respect. Therefore, in the vehicle 1, when the predicted stopping distance is longer than the target stopping distance, the correction of the deceleration is performed, and braking is performed at the deceleration after having been corrected. As a result, in the vehicle 1, as illustrated in FIG. 3D, the stop position when the host vehicle has actually stopped is overlapped with the target stop position, so that it is possible to appropriately stop the host vehicle at the target stop position.

In FIG. 3C, the faster current speed of the host vehicle than that in FIG. 3B results in the further longer predicted stopping distance than that in FIG. 3B. This results in a larger stopping distance difference in FIG. 3C than that in FIG. 3B. The stopping distance difference is a difference between the predicted stopping distance and the target stopping distance. Note that, in FIG. 3C, the predicted stopping distance is longer than the target stopping distance, and the correction of the deceleration is thus performed.

The larger stopping distance difference may result in that the host vehicle go far over the target stop position when decelerating and stopping. There is room for improvement in this respect. Therefore, in the vehicle 1, the correction amount of the deceleration is made larger as the stopping distance difference is larger, and the braking is performed at the larger deceleration after having been corrected. As a result, in the vehicle 1, as illustrated in FIG. 3D, even when the stopping distance difference is large, it is possible to appropriately stop the host vehicle at the target stop position.

Figure 4A:
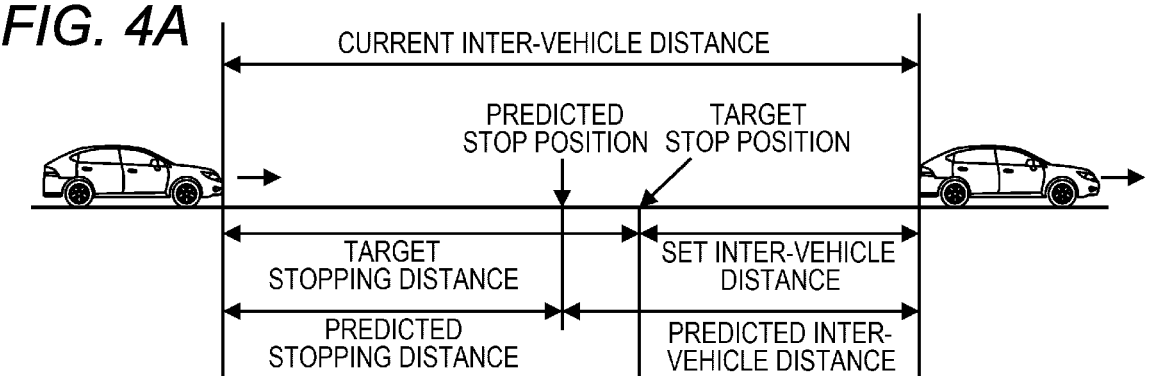
FIGS. 4A to 4D are diagrams illustrating the correction of the deceleration when a specific object that can be a cause of collision is present in the travel direction of the host vehicle.
Figure 4B:
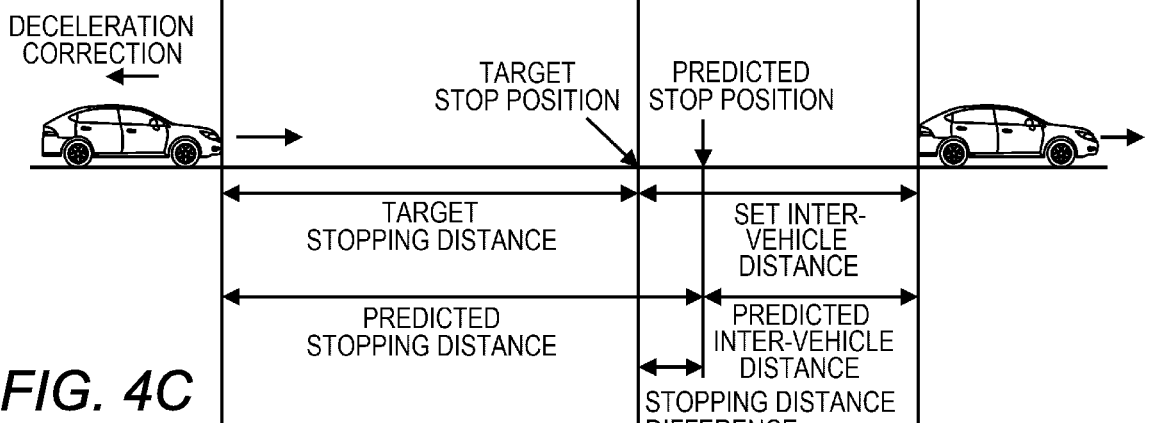
Figure 4C:
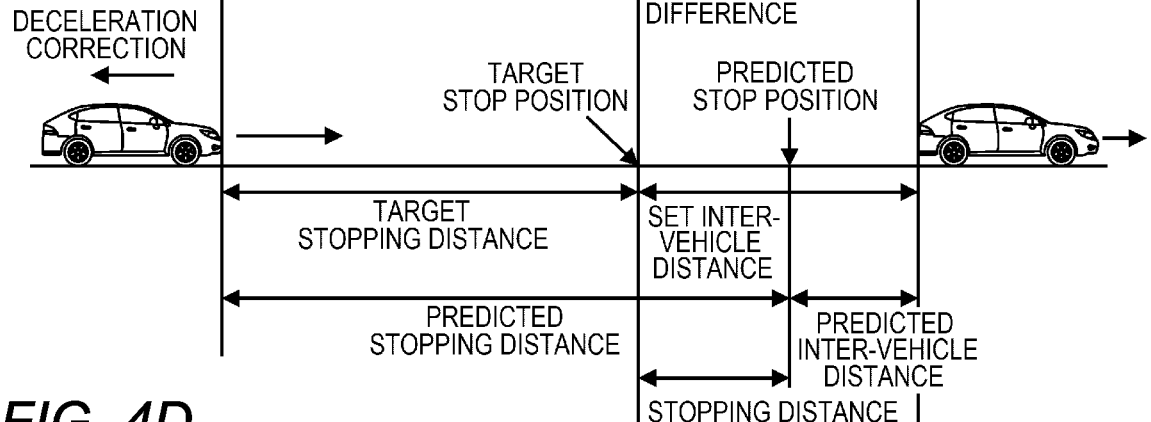
Figure 4D:
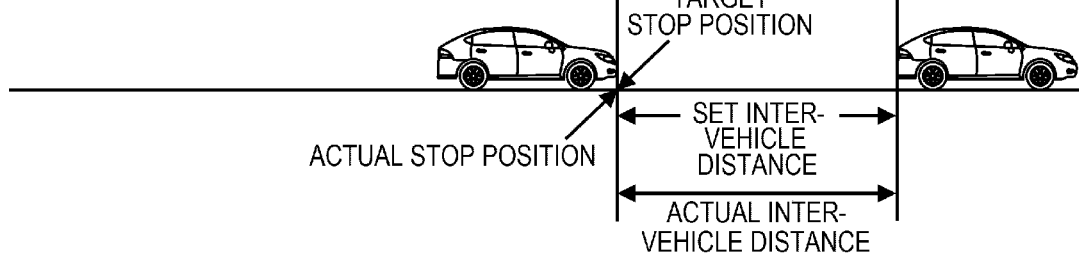

FIGS. 4A to 4D are diagrams illustrating the correction of the deceleration when a specific object that can be a cause of collision is present in the travel direction of the host vehicle. FIG. 4A illustrates a case where no correction of the deceleration is performed, FIG. 4B and FIG. 4C each illustrate a case where the correction of the deceleration is performed, and FIG. 4D illustrates a case where the host vehicle has finally stopped. Note that, in FIGS. 4A to 4D, the preceding vehicle is illustrated as one example of a specific object. The specific object is not limited to the preceding vehicle. The specific object may be a person, a bicycle, a wall, or the like.

In FIGS. 4A to 4C, it is assumed that the host vehicle is traveling by following the preceding vehicle. When the preceding vehicle decelerates, the driver of the host vehicle performs a deceleration operation with the common pedal 16 in accordance with the deceleration of the preceding vehicle. When the deceleration operation is performed, the host vehicle decelerates at the deceleration in accordance with the deceleration operation, and is finally stopped.

In FIG. 4A, it is assumed that the current relative speed of the host vehicle relative to a specific object in the travel direction of the host vehicle (hereinafter, simply referred to as the relative speed of the host vehicle, in some cases) is slow. Moreover, in FIG. 4B, it is assumed that the current relative speed of the host vehicle is faster than that in FIG. 4A, and in FIG. 4C, the current speed of the host vehicle is faster than that in FIG. 4B.

In FIGS. 4A to 4D, a set inter-vehicle distance is an inter-vehicle distance when the host vehicle stops that is set by the inter-vehicle distance setting unit 24. When a specific object (preceding vehicle) is present in the travel direction of the host vehicle, a target stop position at which the host vehicle is to stop is determined based on the set inter-vehicle distance. For example, the target stop position is located between the host vehicle and the specific object, and is determined as a position apparat from the specific object toward the host vehicle by the set inter-vehicle distance. Therefore, when the specific object is moved, the target stop position is also moved along with the movement.

Therefore, as illustrated in FIGS. 4A to 4C, the target stopping distance is a distance from the current position of the host vehicle to the target stop position, and corresponds to a difference between the current inter-vehicle distance and the set inter-vehicle distance.

Moreover, as illustrated in FIGS. 4A to 4C, a predicted inter-vehicle distance is an inter-vehicle distance when the host vehicle decelerates and stops at a predicted stop position, and is a distance between the predicted stop position and the specific object. The predicted stop position, the predicted stopping distance, and the predicted inter-vehicle distance differ depending on the current relative speed of the host vehicle and the current deceleration of the host vehicle.

In the case of FIG. 4A, the slow current relative speed of the host vehicle results in the predicted stopping distance shorter than the target stopping distance. In this case, the host vehicle does not go over the target stop position (that is, a position closer to the host vehicle by the set inter-vehicle distance from the preceding vehicle) when decelerating and stopping, and thus is capable of appropriately stopping. In other words, the predicted inter-vehicle distance is longer than the set inter-vehicle distance, so that the host vehicle can appropriately maintain the inter-vehicle distance. Therefore, in the vehicle 1, when the predicted stopping distance is shorter than the target stopping distance, no correction of the deceleration is performed but braking is performed at the pedal deceleration.

When the current relative speed of the host vehicle becomes faster, as illustrated in FIG. 4B, the predicted stopping distance is longer than the target stopping distance in some cases. In that case, the host vehicle goes over the target stop position when decelerating and stopping, which may result in that the inter-vehicle distance when the host vehicle stops is shorter than the set inter-vehicle distance. There is room for improvement in this respect. Therefore, in the vehicle 1, when the predicted stopping distance is longer than the target stopping distance, the correction of the deceleration is performed, and braking is performed at the deceleration after having been corrected. As a result, in the vehicle 1, as illustrated in FIG. 4D, the set inter-vehicle distance can be maintained when the host vehicle has actually stopped, so that it is possible to appropriately stop the host vehicle.

In FIG. 4C, the current relative speed of the host vehicle is faster than that in FIG. 4B, so that the predicted stopping distance is further longer than that in FIG. 4B. Accordingly, in FIG. 4C, a stopping distance difference (in other words, inter-vehicle distance difference) is larger than that in FIG. 4B. The stopping distance difference herein is a difference between the predicted stopping distance and the target stopping distance, and corresponds to an inter-vehicle distance difference that is a difference between the set inter-vehicle distance and the predicted inter-vehicle distance. Note that, in FIG. 4C, the predicted stopping distance is longer than the target stopping distance, and the correction of the deceleration is thus performed.

When the stopping distance difference (inter-vehicle distance difference) becomes large, the host vehicle goes far over the target stop position when decelerating and stopping, which may result in that the inter-vehicle distance when the host vehicle stops is further shorter than the set inter-vehicle distance. There is room for improvement in this respect. Therefore, in the vehicle 1, the correction amount of the deceleration is made larger as the stopping distance difference (inter-vehicle distance difference) is larger, and the braking is performed at the larger deceleration after having been corrected. As a result, in the vehicle 1, as illustrated in FIG. 4D, even when the stopping distance difference (inter-vehicle distance difference) is large, it is possible to appropriately stop the host vehicle at the target stop position.

Note that, in the vehicle 1, the correction function to correct the deceleration of the host vehicle may be switchable between on and off. Moreover, in the vehicle 1, the single pedal function may be switchable between on and off.

Referring back to FIG. 1, the controller 22 functions as a deceleration deriving unit 40, a first distance deriving unit 42, a second distance deriving unit 44, and a deceleration correcting unit 46 by executing a program. The processes in FIGS. 3A to 3D and FIGS. 4A to 4D are implemented by these functional units. Hereinafter, the individual functional units will be described in detail.

The deceleration deriving unit 40 acquires the depression amount of the common pedal 16 detected by the depression amount sensor 18. When the depression amount of the common pedal 16 is in the deceleration area, the deceleration deriving unit 40 derives a deceleration (pedal deceleration) of the host vehicle based on the depression amount of the common pedal 16.

The first distance deriving unit 42 derives a predicted stopping distance based on the deceleration (pedal deceleration) detected by the deceleration deriving unit 40 and the speed of the host vehicle.

The second distance deriving unit 44 derives a target stopping distance based on the signal color of the traffic light recognized by the outside environment recognition device 12 and a stop line. For example, when the traffic light indicates a red signal and a yellow signal, the second distance deriving unit 44 determines a stop line that is located closer to the side of the host vehicle than the traffic light, as a target stop position. The stop line may be recognized directly from a brightness image and a distance image. Alternatively, a traffic light is recognized from a brightness image and a distance image, and the stop line may be recognized from the position of the traffic light by assumption. The second distance deriving unit 44 derives, based on the distance image, a distance to the stop line determined as a target stop position, as a target stopping distance.

Moreover, the second distance deriving unit 44 derives a target stopping distance based on the specific object (preceding vehicle or the like) recognized by the outside environment recognition device 12. For example, the second distance deriving unit 44 derives a current inter-vehicle distance to the specific object based on the distance image. Moreover, the second distance deriving unit 44 acquires the set inter-vehicle distance set through the inter-vehicle distance setting unit 24. The second distance deriving unit 44 derives a difference between the current inter-vehicle distance and the set inter-vehicle distance as a target stopping distance.

The deceleration correcting unit 46 corrects the deceleration of the host vehicle based on the predicted stopping distance and the target stopping distance. For example, when the predicted stopping distance is longer than the target stopping distance, the deceleration correcting unit 46 increases the deceleration of the host vehicle so as to be more than the deceleration (pedestal deceleration) derived by the deceleration deriving unit 40. The deceleration correcting unit 46 then causes the braking mechanism 20 to operate at the deceleration after having been corrected (corrected deceleration).

On the other hand, when the predicted stopping distance is not longer than the target stopping distance, the deceleration correcting unit 46 does not correct the deceleration. In this case, the deceleration correcting unit 46 causes the braking mechanism 20 to operate at the deceleration (pedal deceleration) derived by the deceleration deriving unit 40.

Moreover, the deceleration correcting unit 46 derives a correction amount of deceleration of the host vehicle based on the stopping distance difference that is a difference between the predicted stopping distance and the target stopping distance. For example, when no specific object is present in the travel direction of the host vehicle (when the vehicle 1 is caused to stop at the stop line), the deceleration correcting unit 46 derives the correction amount using a first correction amount map in which the speed of the host vehicle, the stopping distance difference, and the correction amount are associated with one another.

FIG. 5 is a diagram illustrating a first correction amount map. Values in the map of FIG. 5 illustrate examples of absolute values (km/h) of the correction amount of deceleration. Note that, the specific values of the correction amount are not limited to the illustrated values.

In the first correction amount map, the correction amount is set larger as the speed of the host vehicle is faster or the stopping distance difference is larger. Moreover, in the first correction amount map, the correction amount is set smaller as the speed of the host vehicle is slower or the stopping distance difference is smaller.

The deceleration correcting unit 46 derives a corrected deceleration by adding the correction amount derived from the first correction amount map to the pedal deceleration. Adding the correction amount to the pedal deceleration can reduce the processing load of the deceleration correcting unit 46.

Note that, in the first correction amount map, correction ratios (%) may be set instead of the absolute values of the correction amount. In this case, the deceleration correcting unit 46 may derive a corrected deceleration by referring to the first correction amount map in which the correction ratios are set, deriving the correction ratio from the speed of the host vehicle and the stopping distance difference, and multiplying the pedal deceleration by the correction ratio.

Moreover, the deceleration correcting unit 46 is not limited to a mode in which the correction amount is derived using the first correction amount map. For example, the deceleration correcting unit 46 may derive the correction amount using a relational expression in which the speed of the host vehicle, the stopping distance difference, and the correction amount are associated with one another.

Moreover, when a specific object is present in the travel direction of the host vehicle, the deceleration correcting unit 46 derives the correction amount using a second correction amount map in which the relative speed of the host vehicle, the stopping distance difference (inter-vehicle distance difference), and the correction amount are associated with one another. In the second correction amount map, the correction amount is set for every level of the set inter-vehicle distance. In other words, the correction amount varies depending on the set inter-vehicle distance.

FIGS. 6A to 6C are diagrams each illustrating a second correction amount map. FIG. 6A illustrates the second correction amount map when the set inter-vehicle distance is "LARGE", FIG. 6B illustrates the second correction amount map when the set inter-vehicle distance is "MEDIUM", and FIG. 6C illustrates the second correction amount map when the set inter-vehicle distance is "SMALL". Values in the maps of FIGS. 6A to 6C illustrate examples of absolute values (km/h) of the correction amount of deceleration. Note that, the specific values of the correction amount are not limited to the illustrated values.

In the second correction amount map, the correction amount is set larger as the relative speed of the host vehicle is faster or the stopping distance difference is larger. Moreover, in the second correction amount map, the correction amount is set smaller as the relative speed of the host vehicle is slower or the stopping distance difference is smaller.

Moreover, in the second correction amount map, the correction amount is generally set smaller as the set inter-vehicle distance is larger, and the correction amount is generally set larger as the set inter-vehicle distance is smaller.

The deceleration correcting unit 46 derives a corrected deceleration by adding the correction amount derived from the second correction amount map to the pedal deceleration. Adding the correction amount to the pedal deceleration can reduce the processing load of the deceleration correcting unit 46.

Note that, in the second correction amount map, correction ratios (%) may be set instead of the absolute values of the correction amount. In this case, the deceleration correcting unit 46 may derive a corrected deceleration by referring to the second correction amount map in which the correction ratios are set, deriving the correction ratio from the relative speed of the host vehicle and the stopping distance difference, and multiplying the pedal deceleration by the correction ratio.

Moreover, the deceleration correcting unit 46 is not limited to a mode in which the correction amount is derived using the second correction amount map. For example, the deceleration correcting unit 46 may derive the correction amount using a relational expression in which the relative speed of the host vehicle, the stopping distance difference, and the correction amount are associated with one another.

Figure 7A:
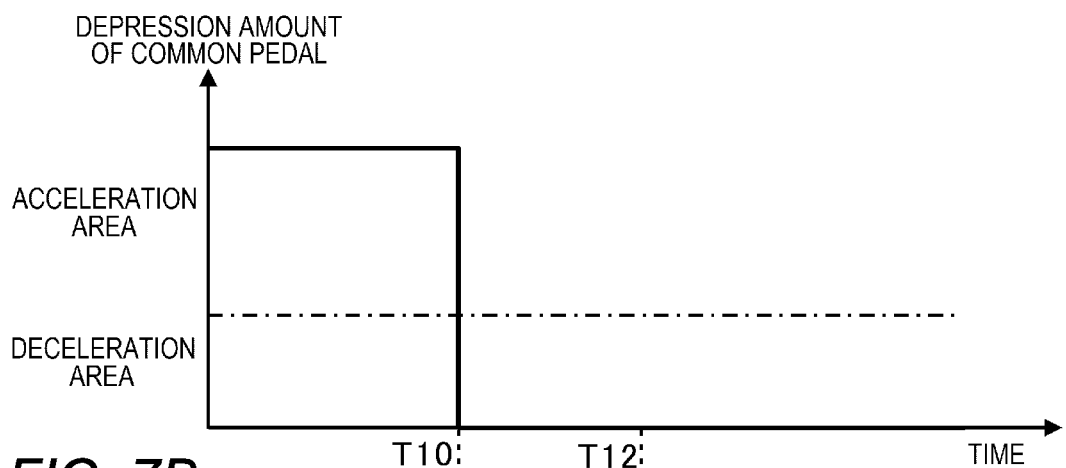
FIGS. 7A to 7C are diagrams illustrating a time transition of the deceleration of the host vehicle.
Figure 7B:
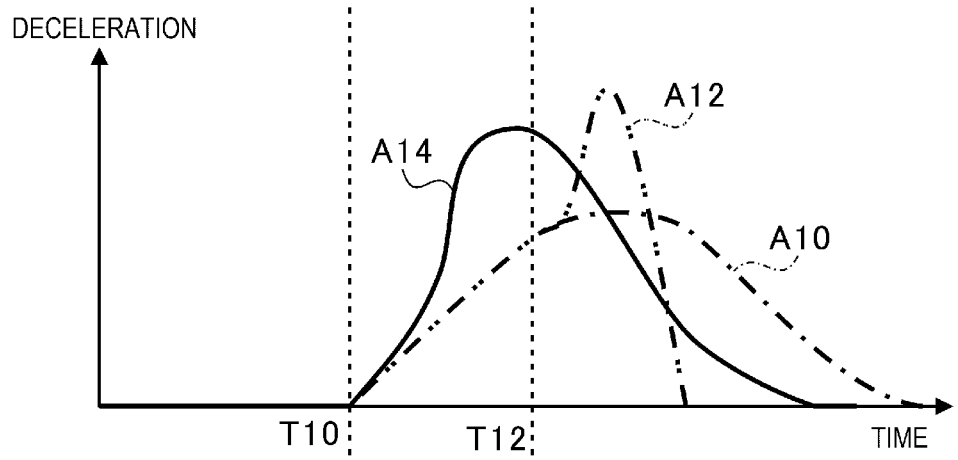
Figure 7C:
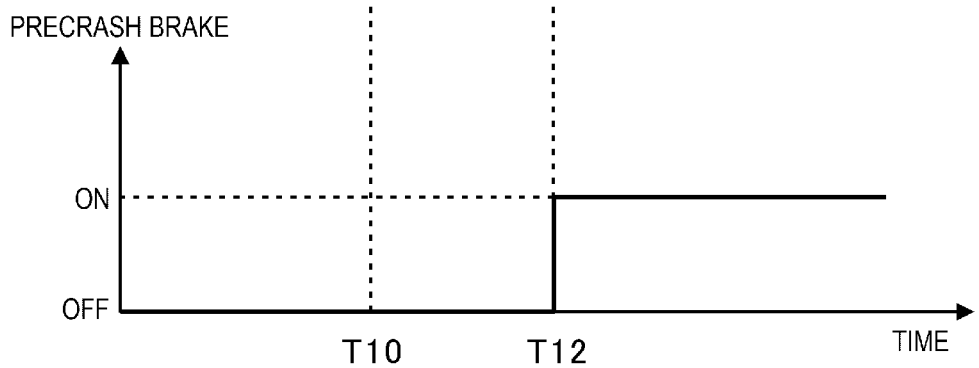

FIGS. 7A to 7C are diagrams illustrating the time transition of the deceleration of the host vehicle. FIG. 7A illustrates the time transition of the depression amount of the common pedal 16, FIG. 7B illustrates the time transition of the deceleration of the host vehicle, and FIG. 7C illustrates the presence or absence of the actuation of a precrash brake. In FIG. 7A, an acceleration area is above the chain line, and a deceleration area is below the chain line. Moreover, in FIG. 7B, a chain line A10 illustrates a case where neither the correction function of the deceleration nor the precrash brake function has been performed, a chain double-dashed line A12 illustrates a case where no correction function of the deceleration has been performed but the precrash brake function has been performed, and a solid line A14 illustrates a case where the deceleration has been corrected.

As illustrated in FIG. 7A, it is assumed that the common pedal 16 has been depressed to the acceleration area before and at a time T10. In this case, the host vehicle travels or accelerates at the constant speed, and the deceleration is zero as illustrated in FIG. 7B. Moreover, it is assumed that the driver sets the depression amount of the common pedal 16 to the smallest depression amount so as to decelerate at the time T10 because the preceding vehicle has decelerated. In this case, it is assumed that the deceleration start timing (time T10) by the driver is delayed.

In this situation, when neither the correction function of the deceleration nor the precrash brake function has been performed, as illustrated by the chain line A10 in FIG. 7B, the deceleration of the host vehicle gradually increases in accordance with the elapse of time from the time T10. Accordingly, the host vehicle decelerates in accordance with the elapse of time. When the speed of the host vehicle is lowered, the deceleration of the host vehicle gradually decreases in accordance with the elapse of time. However, because the deceleration start timing is delayed, the host vehicle may collide with the preceding vehicle. There is room for improvement in this respect.

Moreover, when no correction function of the deceleration has been performed but the precrash brake function has been performed, as illustrated by the chain double-dashed line A12 in FIG. 7B, the deceleration of the host vehicle from the time T10 to the time T12 is overlapped with the chain line A10. However, it is assumed that the host vehicle satisfies the precrash brake condition at the time T12 because the deceleration start timing is delayed. Accordingly, as illustrated in FIG. 7C, at and after the time T12, the precrash brake is turned on. Then, as illustrated by the chain double-dashed line A12 in FIG. 7B, the deceleration of the host vehicle sharply rises in a short time, and the host vehicle sharply stops. As a result, in this case, a collision with the preceding vehicle can be prevented, but an inter-vehicle distance when the host vehicle stops may be shorter than the set inter-vehicle distance in some cases.

Moreover, when the precrash brake is actuated, the deceleration sharply rises, so that an inertial force that acts on the driver sharply changes. Therefore, the driving performance is not high in this mode.

Note that, when neither the correction function of the deceleration nor the precrash brake function has been performed, before the host vehicle collides with the preceding vehicle, the driver may operate a brake pedal different from the common pedal 16, and sharply stop the host vehicle. In this case, the deceleration of the host vehicle sharply rises in a short time similar to that illustrated by the chain double-dashed line A12 in FIG. 7B. Therefore, in this mode, a collision with the preceding vehicle can be prevented, but an inter-vehicle distance when the host vehicle stops may be shorter than the set inter-vehicle distance in some cases. Moreover, in this mode, an inertial force that acts on the driver sharply changes, so that the deriving performance is not high.

In contrast, when the correction function of the deceleration is performed, as illustrated by the solid line A14 in FIG. 7B, the deceleration of the host vehicle increases in accordance with the elapse of time from the time T10. The increased amount of the deceleration is larger than those illustrated by the chain line A10 and the chain double-dashed line A12. As in the foregoing, in the mode of correcting the deceleration, the deceleration of the host vehicle from the deceleration start can be made larger than the pedal deceleration. As a result, in this mode, even when the deceleration start timing is delayed, it is possible to stop the host vehicle in the set inter-vehicle distance.

Moreover, in the mode of correcting the deceleration, the deceleration can be made larger from the deceleration start, so that it is possible to prevent the precrash brake from being actuated. Therefore, in this mode, as illustrated by the solid line A14, it is possible to smoothly rise the deceleration. In other words, in this mode, an inertial force that acts on the driver does not sharply change, but smoothly changes. As a result, in the mode of correcting the deceleration, it is possible to make the driving performance higher than in the mode in which the precrash brake is actuated and the mode of operating the brake pedal.

Figure 8:
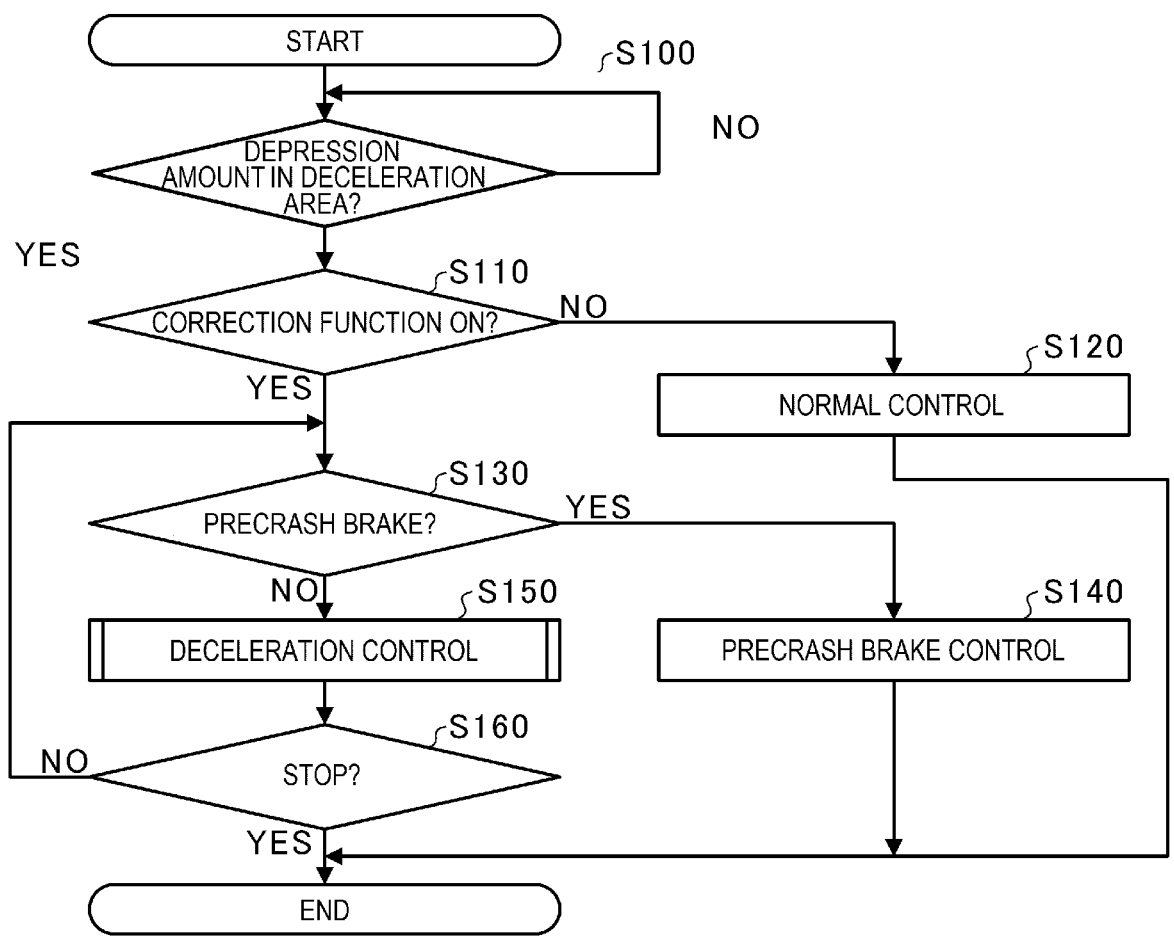
FIG. 8 is a flowchart of an operation of a controller.

FIG. 8 is a flowchart of an operation of the controller 22. The controller 22 acquires the depression amount of the common pedal 16 from the depression sensor at a predetermined control cycle, and determines whether the acquired depression amount is in the deceleration area (S100). If the depression amount is not in the deceleration area (NO in S100), the controller 22 repeats the process in Step S100 until the depression amount enters the deceleration area at every predetermined control cycle.

If the depression amount is in the deceleration area (YES in S100), the controller 22 determines whether the correction function of the deceleration is turned on (effective) (S110). If the correction function is not turned on (NO at S110), the controller 22 performs normal control (S120), and ends the series of the processes. In other words, the controller 22 performs the control of the host vehicle at the deceleration based on the depression amount of the common pedal 16. Accordingly, the host vehicle decelerates in accordance with the deceleration operation of the common pedal 16, and stops.

If the correction function is turned on (YES in S110), the controller 22 determines whether the precrash brake condition has been satisfied (S130). For example, when the relative speed of the host vehicle relative to a specific object such as a preceding vehicle exceeds 30 km/h, the controller 22 determines that the precrash brake condition has been satisfied. Note that, the precrash brake condition is not limited to that in this example.

If the precrash brake condition has been satisfied (YES in S130), the controller 22 preforms the precrash brake control (S140), and ends the series of the processes. Accordingly, the host vehicle controls the braking mechanism 20, and sharply stops.

If the precrash brake condition has not been satisfied (NO in S130), the controller 22 performs the deceleration control (S150). In other words, the controller 22 performs the precrash brake control (S140) in preference to the deceleration control (S150), and performs the deceleration control (S150) under a condition in which the precrash brake is not actuated. The flow of the deceleration control (S150) will be described in detail later.

Next, the controller 22 determines whether the host vehicle has stopped (S160). For example, the controller 22 acquires the speed of the host vehicle from the speed sensor 14, and determines that the host vehicle stops when the acquired speed is equal to or less than a predetermined speed (for example, equal to or less than 1 km/h).

If the host vehicle has stopped (YES in S160), the controller 22 ends the series of the processes. If the host vehicle has not stopped (NO in S160), the controller 22 returns the operation to the process in Step S130, and determines whether the precrash brake condition has been satisfied. In other words, the controller 22 repeats the deceleration control (S150) until the host vehicle stops. Note that, if the precrash brake condition has been satisfied halfway through the deceleration control (S150) being repeated (YES in S130), the controller 22 discontinues the deceleration control (S150), and performs the precrash brake control (S140).

Figure 9:
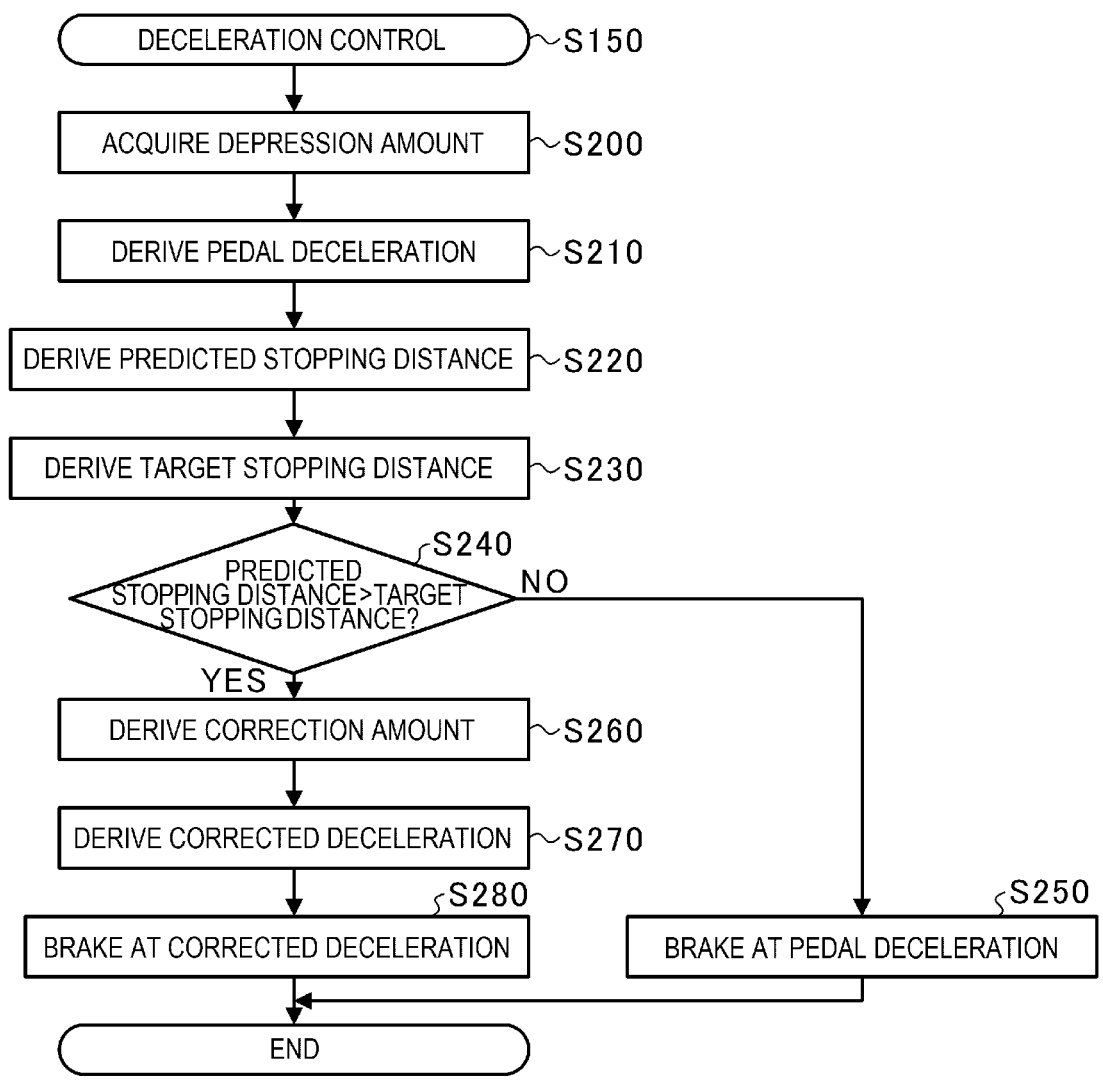
FIG. 9 is a flowchart of deceleration control.

FIG. 9 is a flowchart of the deceleration control (S150). The deceleration deriving unit 40 firstly acquires a current depression amount from the depression amount sensor 18 (S200). Next, the deceleration deriving unit 40 derives a current pedal deceleration based on the current depression amount (S210).

Next, the first distance deriving unit 42 derives a predicted stopping distance (S220). For example, the first distance deriving unit 42 acquires a current speed of the host vehicle from the speed sensor 14. The first distance deriving unit 42 derives a predicted stopping distance from the current speed and the current pedal deceleration.

Next, the second distance deriving unit 44 derives a target stopping distance (S230). For example, when the outside environment recognition device 12 recognizes a traffic light and a stop line in the travel direction, and the traffic light indicates a red signal or a yellow signal, the second distance deriving unit 44 determines a stop line that is present in front of the traffic light as a target stop position. The second distance deriving unit 44 then derives a distance to the determined target stop position (stop line), as a target stopping distance.

Meanwhile, when the outside environment recognition device 12 recognizes a specific object (for example, preceding vehicle) that can be a cause of collision in the travel direction, the second distance deriving unit 44 determines a target stop position based on the set inter-vehicle distance preset through the inter-vehicle distance setting unit 24. The second distance deriving unit 44 derives a current inter-vehicle distance between the host vehicle and the specific object. The second distance deriving unit 44 derives a difference between the current inter-vehicle distance and the set inter-vehicle distance, as a target stopping distance.

Note that, when the outside environment recognition device 12 recognizes neither a red signal, a yellow signal, nor a specific object, the second distance deriving unit 44 may derive a target stopping distance as being infinite, for example.

Next, the deceleration correcting unit 46 determines whether the predicted stopping distance is longer than the target stopping distance (S240). If the predicted stopping distance is not longer than the target stopping distance (NO in S240), the deceleration correcting unit 46 causes the braking mechanism 20 to operate at the current pedal deceleration derived in Step S210 (S250), and ends the series of the processes in FIG. 9.

On the other hand, if the predicted stopping distance is longer than the target stopping distance (YES in S240), the deceleration correcting unit 46 derives a correction amount (S260). For example, the deceleration correcting unit 46 derives a stopping distance difference from the predicted stopping distance and the target stopping distance.

When the stop line has been determined as the target stop position, the deceleration correcting unit 46 refers to the first correction amount map, and derives a correction amount from the current speed and the stopping distance difference.

Meanwhile, when a target stop position has been determined based on the set inter-vehicle distance, the deceleration correcting unit 46 derives a current relative speed of the host vehicle relative to the specific object. For example, the deceleration correcting unit 46 refers to the distance image, and derives a relative speed from the time change of the distance to the specific object. Moreover, the deceleration correcting unit 46 selects a second correction amount map that corresponds to the set inter-vehicle distance, among the plural second correction amount maps. The deceleration correcting unit 46 then refers to the selected second correction amount map, and derives a correction amount from the current relative speed of the host vehicle and the stopping distance difference (inter-vehicle distance difference).

Next, the deceleration correcting unit 46 derives a deceleration after having been corrected (corrected deceleration) based on the derived correction amount (S270). For example, the deceleration correcting unit 46 adds the correction amount derived in Step S260 to the pedal deceleration derived in Step S210. Thereafter, the deceleration correcting unit 46 causes the braking mechanism 20 to operate at the corrected deceleration derived in Step S270 (S280), and ends the series of the processes in FIG. 9.

When such the deceleration control (S150) is repeated, the host vehicle finally stops. The host vehicle after having stopped receives an acceleration operation through the common pedal 16, and thereafter starts and accelerates based on the acceleration operation.

Moreover, there is a case where from when the depression amount of the common pedal 16 enters the deceleration area to when the host vehicle stops, the depression amount of the common pedal 16 exits from the deceleration area (enters the acceleration area). Accordingly, when the current depression amount acquired in Step S200 is in the acceleration area, the deceleration deriving unit 40 may end the deceleration control (S150). In this case, the controller 22 may accelerate the host vehicle in accordance with the depression amount in the acceleration area.

As in the foregoing, in the vehicle 1 in the present embodiment, the deceleration is corrected based on the predicted stopping distance and the target stopping distance. The vehicle 1 in the present embodiment is capable of appropriately stopping.

Moreover, in the vehicle 1 in the present embodiment, when the predicted stopping distance is longer than the target stopping distance, the deceleration of the host vehicle is increased more than the pedal deceleration. Accordingly, the vehicle 1 in the present embodiment can be prevented from traveling over the target stop position, and can appropriately stop. As a result, the present embodiment can prevent the vehicle 1 from stopping over the stop line and the inter-vehicle distance between the vehicle 1 and the preceding vehicle from being short, even when the timing of the deceleration operation is delayed.

Moreover, in the vehicle 1 in the present embodiment, the correction amount of deceleration of the host vehicle is varied based on the stopping distance difference that is a difference between the predicted stopping distance and the target stopping distance. Accordingly, the vehicle 1 in the present embodiment is capable of more appropriately stopping.

Moreover, in the vehicle 1 in the present embodiment, when a specific object that can be a cause of collision is present in the travel direction of the host vehicle, a target stopping distance is derived based on the preset set inter-vehicle distance. Accordingly, the vehicle 1 in the present embodiment is capable of more appropriately stopping even when a preceding vehicle or the like is present in the travel direction of the host vehicle.

Note that, the deceleration correcting unit 46 has corrected the deceleration when the predicted stopping distance is longer than the target stopping distance, and has not corrected the deceleration when the predicted stopping distance is not longer than the target stopping distance. However, when the predicted stopping distance is shorter than the target stopping distance, the deceleration correcting unit 46 may correct the deceleration of the host vehicle so as to be reduced to be smaller than the pedal deceleration. In this mode, it is possible to suppress stopping of the host vehicle before reaching the target stop position. In other words, in this mode, the host vehicle can stop at the target stop position even when the deceleration operation is performed at earlier timing, and is capable of more appropriately stopping.

The embodiment of the disclosure has been described with reference to the accompanying drawings. It is noted that the disclosure is not limited to such the embodiment. It will be apparent to those skilled in the art that various changes and modifications to the embodiment can be conceived within the scope of the appended claims, and it is to be understood that such changes and modifications also belong to the technical scope of the disclosure.

For example, in the above embodiment, the set inter-vehicle distance has been set as the three stages of "LARGE", "MEDIUM", and "SMALL". However, the set inter-vehicle distance is not limited to the aspect in which the set inter-vehicle distance is set step-wisely, but may be linearly settable.

According to the disclosure, the vehicle is capable of appropriately stopping.

The invention claimed is:

1. A vehicle comprising:
    a common pedal configured to receive an acceleration operation and a deceleration operation in accordance with a depression amount; and
    a controller configured to:
        derive a deceleration of the vehicle based on the deceleration operation of the common pedal;
        derive a predicted stopping distance that is a distance between a current position of the vehicle and a predicted stop position at which the vehicle is predicted to stop when travelling at the derived deceleration;
        derive a target stopping distance that is a distance between the current position of the vehicle and a target stop position at which the vehicle is to stop; and
        correct the deceleration of the vehicle based on the predicted stopping distance and the target stopping distance.

2. The vehicle according to claim 1, wherein when the predicted stopping distance is longer than the target stopping distance, the controller increases the deceleration of the vehicle so as to be more than the derived deceleration.

3. The vehicle according to claim 2, wherein the controller derives the target stopping distance based on a set inter-vehicle distance that is a preset inter-vehicle distance for when the vehicle stops.

4. The vehicle according to claim 2, wherein the controller varies a correction amount of the deceleration of the vehicle based on a stopping distance difference that is a difference between the predicted stopping distance and the target stopping distance.

5. The vehicle according to claim 4, wherein the controller derives the target stopping distance based on a set inter-vehicle distance that is a preset inter-vehicle distance for when the vehicle stops.

6. The vehicle according to claim 1, wherein the controller varies a correction amount of the deceleration of the vehicle based on a stopping distance difference that is a difference between the predicted stopping distance and the target stopping distance.

7. The vehicle according to claim 6, wherein the controller derives the target stopping distance based on a set inter-vehicle distance that is a preset inter-vehicle distance for when the vehicle stops.

8. The vehicle according to claim 1, wherein the controller derives the target stopping distance based on a set inter-vehicle distance that is a preset inter-vehicle distance for when the vehicle stops.

9. A vehicle comprising:
    a common pedal configured to receive an acceleration operation and a deceleration operation in accordance with a depression amount; and
    circuitry configured to:
        derive a deceleration of the vehicle based on the deceleration operation of the common pedal;
        derive a predicted stopping distance that is a distance between a current position of the vehicle and a predicted stop position at which the vehicle is predicted to stop when travelling at the derived deceleration;
        derive a target stopping distance that is a distance between the current position of the vehicle and a target stop position at which the vehicle is to stop; and
        correct the deceleration of the vehicle based on the predicted stopping distance and the target stopping distance.

* * * * *